WOOD CHIPPER

Original Filed Aug. 29, 1960 2 Sheets-Sheet 1

INVENTOR.
Paul J. Fontaine,
BY
Parker & Carter
Attorneys.

WOOD CHIPPER

Original Filed Aug. 29, 1960 2 Sheets-Sheet 2

INVENTOR.
Paul J. Fontaine,
BY
Darker & Carter
Attorneys.

United States Patent Office

Re. 26,323
Reissued Dec. 19, 1967

26,323
WOOD CHIPPER

Paul J. Fontaine, Chicago, Ill., assignor, by mesne assignments, to Westinghouse Air Brake Company, Pittsburgh, Pa., a corporation of Pennsylvania Original No. 3,123,311, dated Mar. 3, 1964, Ser. No. 52,451, Aug. 29, 1960. Application for reissue Mar. 2, 1966, Ser. No. 535,638
14 Claims. (Cl. 241—28)

Matter enclosed in heavy brackets [ ] appears in the original patent but forms no part of this reissue specification; matter printed in italics indicates the additions made by reissue.

This invention relates in general to rotary disc chippers and is a continuation in part of an application entitled "Wood Chipper," Serial No. 857,838, filed December 7, 1959, *now Patent No. 3,144,995*. It relates more particularly to a new and improved chipper construction productive of a maximum percentage of high quality wood chips.

In producing wood chips from wood stock such as slabs or the like, chips having certain desirable characteristics are sought. In conjunction with this, it will be readily seen that a chipper which efficiently produces chips at a maximum rate, a high percentage of which have these optimum characteristics, is not desirable.

The aforementionad characteristics are primarily desirable from a wood pulp manufacturing standpoint. The chips used for such purposes should have a generally constant length parallel to the grain to insure uniform fiber length and optimum penetration during cooking. The cleanness of cut or shear is important since in the absence thereof, squeezed chips and poor cooking characteristics result. In conjunction with this, the chips must be cut at an angle to the grain to insure open pores for best cooking characteristics. These and other qualities including the desirability of insuring uniform length from chip to chip are of prime importance.

It has been found with a conventional rotary disc chipper that a vertical infeed insures the production of chips having many of these desirable characteristics. The vertical infeed, however, involves feeding slabs or logs or the like into engagement with the knife carrying face of the rotating disc in one of the quadrants of the disc at a downwardly inclined angle to the rotating face. This requires specially designed conveying and handling equipment for the slabs or logs or the like since they must be initially raised and handled at a level above the chipper itself. In addition, the chipper must be beefed up since the chipping operation is taking place substantially on a level with the horizontal axis of the chipper disc and, consequently, a high range of forces are thrown upon the chipper mountings during the chipping operation. It will be readily seen that the use of the vertical infeed construction injects construction and operational problems which require expensive and, consequently, undesirable solution.

The horizontal infeed construction has been used for some time because of simplicity of construction and ease of operation. Horizontal infeed rotary disc chippers, however, have heretofore been incapable of producing wood chips, for example, in quantities having a maximum percentage of superior quality chips. The ordinary horizontal infeed chipper sacrifices optimum performance for the ease and low expense of operation inherent in this construction.

Accordingly, it is a primary object of this invention to provide a rotary disc chipper which produces a maximum percentage of high quality wood chips.

Another object is to provide a rotary disc chipper having a horizontally disposed infeed which produces chips having the aforedescribed characteristics.

Another object is to provide a chipper having an infeed chute extending horizontally from the face of the chipper disc in one of the lower quadrants of the disc.

Yet another object is to provide a rotary disc chipper having a vertically disposed anvil aligned generally with the vertical [axis] *radius* of the knife carrying disc face so as to provide optimum knife edge utilization.

Still another object is to provide a rotary disc chipper having a horizontal infeed which assures slab feed such that the width of a slab is always against the fixed anvil.

Another object is to provide a chipper having a knife orientation such that a downward force component is imparted to material fed to the chipper to prevent vibration and chattering of the material during the chipping operation.

Yet another object of this invention is to provide a chipper having an infeed chute extending horizontally from the knife carrying face of the chipper disc at an optimum angle to the face.

Still another object is to provide a chipper which produces high quality chips yet is relatively inexpensive and requires no special slab handling equipment.

Yet another object is to provide a horizontal infeed chute for a chipper of the aforedescribed character wherein slabs having enlarged butt ends are easily accommodated.

These and other objects of this invention will be found in the following specification and claims wherein like reference numerals identify like parts throughout.

The invention is illustrated more or less diagrammatically in the drawings wherein.

Figure 1:
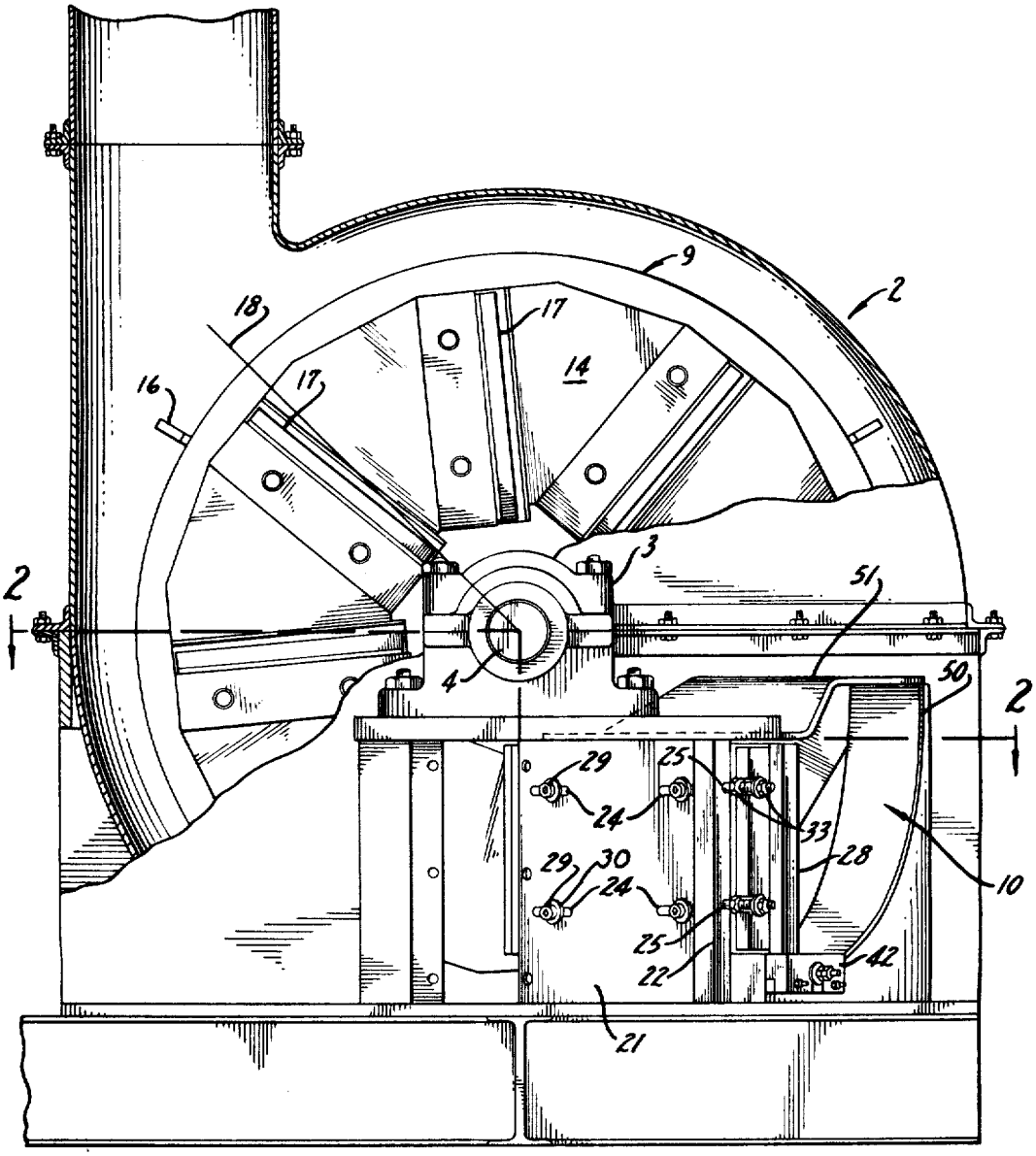
FIGURE 1 is a front elevation with parts broken away of a wood chipper embodying this invention.

Referring to FIGURE 1, the wood chipper includes an upright housing indicated generally at 2, adapted for mounting on a horizontal surface. Pillow blocks 3 formed integrally with opposite sides of the housing form bearing means for shaft 4 which is adapted to rotate about a horizontal axis transverse to the housing. One end of the shaft 4 extends beyond a corresponding bearing and has mounted adjacent its outer end a series of pulleys 5. Pulleys 5 are driven through a series of conventional V-belts 6 from a source not shown. A generally circular chipping rotor indicated at 9 is mounted on shaft 4 within the housing 2 for rotation with the shaft in a plane perpendicular to the axis of the shaft. Adjacent the lower quadrant of the rotor 9 and extending through the housing 2 is a wood stock feed chute or feed spout indicated generally at 10.

The chipping rotor 9 comprises a disc 13 fashioned of heavy steel stock having a knife carrying face 14 and a rear face 15. Chip remover fans 16 are secured to the rear face at generally regularly spaced intervals around its periphery in a conventional fashion.

Chipper knives 17, which might be of the construction shown in the aforementioned co-pending application, extend generally radially of the face 14 but are offset 3 to 7 degrees from a radius of the face. To be more explicit, the outer end of the chipper knife is in trailing relation of a radius of the face to which the inner end of the chipper knife is in leading relation. This is shown graphically at 18 in FIGURE 1, for example. The reason for this offset mounting will be more fully explained in the description of the use and operation of this invention.

Figure 2:
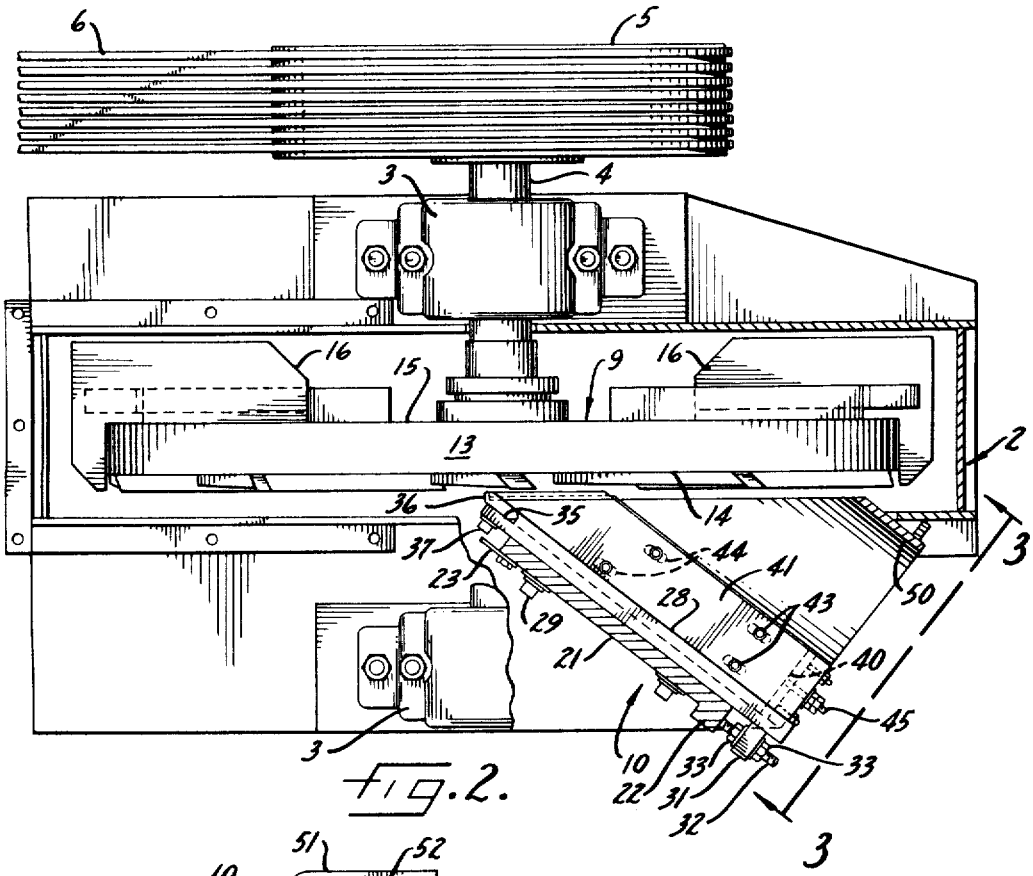
FIGURE 2 is a view taken along line 2—2 of FIGURE 1.

The relationship of the wood stock feed chute 10 to the housing 2 and the chipping rotor 9 is best seen in FIGURES 1 and 2. The feed chute 10 pierces the housing 2 in a lower quadrant of the chipper rotor. A plate 21 having a vertically extending flange 22 forms one side of the feed chute 10. A thin fillet plate 23 connects the inner end of plate 21 with the housing 2. The fillet plate might be removable, for example, to provide an inspection plate. Four horizontally extending slots 24 extend through the plate 21. A pair of internally threaded holes 25 are vertically spaced in the flange 22.

An anvil or bed knife carrying slide 28 is secured to the inner wall of the plate 21 by bolts 29 which extend through the slots 24 and are threaded into internally threaded holes, not shown in the slide. Washers 30 prevent the heads of the bolts 29 from passing through the slots 24.

Vertically spaced on the outer end of the slide 28 are internally threaded collars 31. Adjusting bolts 32 extend through the collars 31 into threaded engagement with the internally threaded holes 25 in the flanges 22. Lock nuts 33 on the bolts 32 lock the bolt in a predetermined position relative to the collars 31. Consequently, the slide 28 may be locked in a predetermined position relative to the plate 21.

At the inner end of the plate 28, vertically extending notch 35 is formed. An anvil or bed knife 36, which might be comprised of Stellite or any other hard metal is snugly seated in the notch and held therein by bolts 37 extending through the slide 28 adjacent the notch 35. The plate 21 is positioned so that slide 28 will carry anvil 36 into proper relationship with the cutting surface of the chipper knife at a point on or slightly behind the vertical radius of the chipper disc 13 *as viewed toward the face of the disc*. Anvil 36 extends vertically and is parallel to the aforementioned radius.

Figure 3:
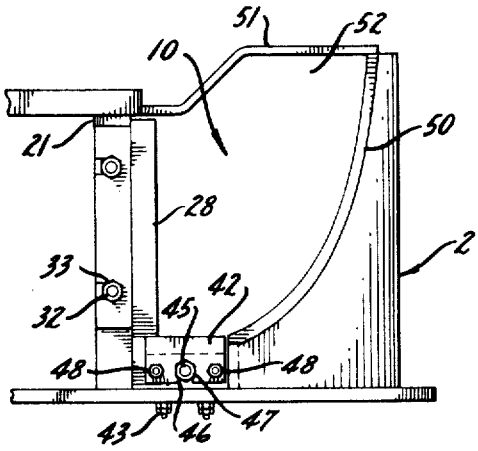
FIGURE 3 is a view taken along line 3—3 of FIGURE 2.

Shown in dotted lines in FIGURES 2 and 3 is the base plate 40 of the feed chute. A base slide 41 having a downwardly extending flange 42 at its outer end overlies plate 40. The base slide 41 has threaded into its bottom face a set of bolts 43 which extend through longitudinally disposed slots 44 in the plate 40 and secure the slide 41 to the plate 40 for sliding movement relative thereto in a direction parallel to the slide 28. The flange 42 has an adjusting bolt 45 extending through a slot 46 therein into threaded engagement with base plate 40. Bolt 45 carries lock nuts 47 on its outer extremity. Limit stop bolts 48 extend through the flange on either side of the bolt 45 and engage the outer end of the base plate 40 to limit movement of the base slide 41 as it is adjusted by bolt 45 relative to the chipper knives.

A curvilinear plate 50 forms the other wall of the feed chute 10 and extends through and into the housing 2, as is seen in FIGURE 2. It joins relatively narrow base slide 41 at the bottom and irregularly shaped cover plate 51 at the top.

Cover plate 51 overlies the chute 10 and connects plate side walls 21 and 50. The cover is irregularly shaped in such a manner as to leave an enlarged path 52 adjacent the upper corner of the chute 10 opposite the anvil.

The chute 10 is constructed and arranged such that slide 28 extends at angle of approximately 38 degrees to the knife carrying face 14 of the chipper disc 13.

The use and operation of this invention are as follows:

In the production of wood ships for ordinary use in the manufacture of wood pulp, the rough wood stock employed is commonly in slab form. This invention is consequently primarily concerned with the handling of wood slabs but it will be understood that many advantages are also inherent which apply equally as well as to other forms of wood stock, such as logs, or other materials entirely, for example.

The feed chute 10 is constructted and arranged such that it extends at an angle of approximately 38 degrees to the face 14 of the chipper disc 13. Consequently, wood stock passing through the chute into engagement with the chipper knives 17 will engage the face at this angle. An angle of 38 degrees has been found to best insure the resulting chips having uncrushed, open, and consequently desirable pore structure.

The wall 21 of chute 10 is positioned such that it supports the vertical slide 28 in a manner which insures the anvil 36 being in proper relation to the chipper knives. That is, at a point on or slightly behind or ahead of the vertical radius of the chipper disc 13 *as viewed toward the working face of the disc*. This relationship is best seen in FIGURE 2 and has been found most desirable in practice. The anvil lies, however, for all practical purposes, substantially along the vertical radius of the chipper disc such that maximum knife edge exposure is obtained when the knives pass the anvil 36. Slide 28 is horizontally adjustable on plate 21 to provide proper adjustment of the anvil 36 relative to the chipper knives 17. This adjustment feature is also found in base slide 41.

Chipper knives 17 are mounted on the knife carrying face 14 of the chipper disc 13 at an angle of approximately 3 to 7 degrees from a radius of the disc. This insures as will be seen in FIGURE 1, that the inner end of the chipper knife will lead the outer end through a chipping pass by a slight amount. It will consequently pass the anvil slightly in advance of the outer end. This produces somewhat of a scissors effect, as might be easily seen in FIGURE 1, and insures that a slab of wood fed through the chute 10 into engagement with the chipper knife carrying face 14 is continually urged into the lower corner of the chute 10 adjacent the anvil. The result is an elimination of vibration or chattering normally found in chippers of this type which occurs when the wood stock has an opportunity to move up and down on the anvil face as successive chipping blades engage it.

As will be seen in FIGURE 3, the cross section of the wood stock feed chute 10 is irregular along its outer wall 50 and cover plate 51. By virtue of the curvilinear shape of the outer wall 50, a most advantageous feed attitute of the slab is insured. As the slabs enter the feed chute 10, they are forced up on edge by the curvilinear wall and consequently come into engagement with the rotating chipper knives when their widths are aligned with and in general, in engagement with, the anvil 36. Consequently, the best chipping relationship is attained at the outset since the slabs will be held along their width tightly against the anvil by the rotating knives and no rolling or turning of the wood stock will be effected. Such an initial turning of a slab results in the production of a relatively high percentage of poor wood chips. Such poor chips were commonly produced in abundance when slabs were fed in such a manner that their width lay along the base plate of a feed chute. In this attitude, the chipper knives would successively engage a slag and tend to turn it slowly up into on-edge relationship. During this transition period, chips of very poor quality having squeezed pores, inconsistent lengths and uncleanly sheared faces are normally produced.

The cover plate 51 is constructed such that the chute will readily accommodate slabs having large butt ends, a common occurrence in wood stock of this type. As again will be seen in FIGURE 3, a considerably enlarged area 52 is formed in the upper and outer corner of the chute 10. Thus, when slabs having large butt ends are fed into the chipper chute, butt ends first, the slab will be able to pass through the chute with ease. It will be understood, of course, that the chips cut from the enlarged butt end will be of lesser quality since they will be cut from the slab while it is constantly turning inwardly in a tendency to place its width against the anvil 36, but after the butt end has been stripped off the slab, a high quality chip will again be produced throughout the length of the slab.

What has been shown then is a wood chipper of the rotary disc type having a horizontal infeed which, nevertheless, produces a maximum percentage of chips of optimum quality. This horizontal infeed permits inexpensive construction of the chipper itself and lower horsepower demands on the driving motors. These advantages are provided by the particular construction of the infeed chute and its relation to the rotating chipper knives.

It will be seen that slabs will be delivered into engagement with the rotating chipper knives at attitudes productive of this maximum percentage of high quality chips and the maximum knife edge area will be utilized in each chipping pass since the anvil is generally along the vertical [axis] *radius* of the chipper disc 13.

Vibration and chattering is prevented, due to the slightly offset chipper knives 17 engaging the wood stock such that the outer end of the knife trails the inner end with regard to a radius of the chipper disc. The wood stock is firmly held in one attitude by virtue of this construction.

What has been shown and described is a new and improved rotary disc chipper which is relatively inexpensive to construct and operate and which is productive of a maximum percentage of high quality wood chips. It is intended that the foregoing description be illustrative only, however, and not definitive and the scope of the invention should be limited only by the appended claims.

I claim:

1. A method of reducing an elongated slab of wood into wood chips in a wood chipper having a chipper disc rotating about a horizontal axis with a plurality of chipper knives on one face moving past a fixed vertical anvil positioned generally parallel to the vertical radius of the disc, including the steps of positioning a slab below the axis of rotation of the disc, feeding the slab horizontally at an acute angle to the face of the disc, contacting the slab in an on-edge relationship with the chipper knives, keeping the width of the slab against the anvil, and maintaining the slab in on-edge relationship with the disc so that the knives cut across the slab.

2. A wood chipper for processing slabs of wood or the like comprising a housing, a disc mounted within said housing and adapted for rotation in one direction in a substantially vertical plane, a substantially radially extending chipping knife seated in one face of said disc, a substantially vertical anvil fixedly secured within said housing and extending substantially parallel to the vertical radius of said disc in a lower quadrant of said disc, a horizontally disposed feed chute extending laterally of said disc and adapted to deliver a slab of wood into engagement with said face in front of said anvil, said feed chute comprising a vertically extending inner wall in alignment with an supporting said anvil, a relatively narrow base plate joining said inner wall at its base and forming the bottom of said chute, an outer guide wall diverging upwardly from said inner wall and joining said base, said guide wall extending substantially above the level of said inner wall, said guide wall having a lower portion extending inwardly and an upper portion extending outwardly, and an irregularly shaped cover plate overlying said walls so as to present an enlarged area extending the length of said chute adjacent the junction of said guide wall and said cover plate and thus permit passage of wood slabs having abnormally large butt ends.

3. A wood chipper for processing slabs of wood or the like comprising a housing, a disc mounted within said housing and adapted for rotation in one direction in a substantially vertical plane, a substantially radially extending chipping knife seated in one face of said disc, a substantially vertical anvil fixedly secured within said housing and extending substantially parallel to the vertical radius of said disc, a horizontally disposed feed chute forming an angle with the face of said disc, said feed chute extending transversely of a lower quadrant of said disc and including a first side wall extending in substantially vertical alignment with said anvil, a relatively narrow base, and a guide wall connected to said base and forming the opposite side of said chute, said guide wall diverging upwardly from said first wall, said guide wall having a lower portion extending inwardly and an upper portion extending outwardly so as to tend to maintain said slab in one-edge relationship throughout the passage of said slab through the feed chute.

4. In a chipper having a rotary disc fitted with knives, said disc knives having cutting edges uniformly spaced away from the plane of the disc and a coacting bed knife having a straight cutting edge, a feed spout comprising a tubular member extending into the chipper adjacent to the bed knife, said member having an inner end and an outer end, said inner end being disposed in a plane substatially parallel to the plane of the disc and to the cutting edge of the bed knife, said member having a flat side wall disposed parallel to the straight cutting edge of the bed knife, a top wall disposed substantially at right angles to the side wall and a curved wall connecting the side and top walls.

5. The structure as claimed in claim 4 wherein the side wall is disposed at an acute angle to the axis of rotation of the disc.

6. A wood chipper for processing slabs of wood or the like comprising a housing, a disc mounted within said housing and adapted for rotation in a substantially vertical plane, a substantially radially extending knife on one face of said disc, a vertical anvil fixedly secured within said housing and extending substantially parallel to a vertical radius of said disc, a horizontally disposed feed chute extending laterally of said disc, said feed chute forming an angle with the face of the disc, said chute having a side wall extending in substantially vertical alignment with said anvil, and an opposed guide wall, said guide wall having a lower portion extending inwardly and an upper portion extending outwardly to maintain said slab in on-edge relationship with said disc and insuring engagement of the width of said slab with said anvil throughout the length of the slab.

*7. In a wood chipper, the combination of*

*a chipper disc mounted for rotation in a generally vertical plane, said chipper disc being adapted to receive knife means mounted on the working face thereof;*

*a housing enclosing the chipper disc, said housing having a chip outlet,*

*a generally horizontally disposed feed chute which terminates at a feed chute inlet at the housing, and*

*a chipping anvil associated with the housing and feed chute at the feed chute inlet,*

*said anvil lying substantially along the vertical radius of the chipper disc as viewed toward the working face thereof.*

*8. The wood chipper of claim 7 further characterized in that the anvil lies slightly behind the vertical radius of the chipper disc as viewed toward the working face thereof.*

*9. The wood chipper of claim 7 further characterized in that the anvil is coextensive with the vertical radius of the chipper disc as viewed toward the working face thereof.*

*10. The wood chipper of claim 7 further characterized in that the anvil lies slightly ahead of the vertical radius of the chipper disc as viewed toward the working face thereof.*

*11. The wood chipper of claim 7 further characterized in that*

*the feed chute narrows toward the chipper disc to facilitate the placement of the width of the wood stock flat against the anvil.*

*12. In a wood chipper, the combination of*

*a chipper disc mounted for rotation in a generally vertical plane, said chipper disc being adapted to receive knife means mounted on the working face thereof;*

*a housing enclosing the chipper disc, said housing having a chip outlet,*

*a generally horizontally disposed feed chute which terminates at a feed chute inlet at the housing, and*

*a chipping anvil associated with the housing and feed chute at the feed chute inlet,*

*said anvil being aligned generally with the vertical radius of the chipper disc as viewed toward the working face thereof, at least one point of the anvil coinciding with the vertical radius of the anvil as viewed toward the working face thereof.*

*13. In a wood chipper, the combination of*

*chipper disc means having knife means associated therewith,*

*housing structure associated with the chipper disc means,*

*a generally horizontally disposed feed chute having a feed chute inlet at the housing structure, and*

*a chipping anvil associated with the housing structure and feed chute at the feed chute inlet,*

*said generally horizontally disposed feed chute having means, at the feed chute inlet end, which turns wood stock into an on-edge position in which the wood stock is urged into firm, non-turning contact with the anvil from the commencement of the chipping action,*

*said means including oppositely located side walls which are spaced apart from one another a distance less than the maximum width of the wood stock at their exit adjacent the chipper disc.*

*14. The wood chipper of claim 13 further characterized in that*

*the feed chute narrows in a direction looking toward the chipper disc*

*whereby wood stock having a flat side will be turned into an on-edge position prior to commencement of the chipping action.*

References Cited

The following references, cited by the Examiner, are of record in the patented file of this patent or the original patent.

UNITED STATES PATENTS

| | | | |
|---|---|---|---|
| 2,269,352 | 1/1942 | Bacon | 144—176 |
| 2,605,800 | 8/1952 | Mateu | 241—92 X |
| 2,714,490 | 8/1955 | Pretcher | 241—92 |
| 2,756,788 | 7/1956 | Fish | 241—92 X |
| 2,663,506 | 12/1953 | Vaughan | 241—278 |
| 3,000,411 | 9/1961 | Ealet | 241—176 |
| 3,069,101 | 12/1962 | Wexell | 241—92 |
| 2,566,721 | 9/1951 | Dunbar. | |
| 2,712,904 | 7/1955 | Durkee. | |
| 2,963,059 | 12/1960 | Grub. | |
| 3,047,244 | 7/1962 | Hansel. | |
| 3,061,207 | 10/1962 | Clark. | |
| 3,069,101 | 12/1962 | Wexell. | |

FOREIGN PATENTS

| | | |
|---|---|---|
| 45,150 | 3/1917 | Sweden. |

OTHER REFERENCES

Brown: Pulp and Paper Magazine of Canada, vol. 49, number 11, pages 95–97. (Copy in Scientific Library.)

Daspapier (German), vol. 14, pp. 56–58 (Jan.–June 1960). (Copy in Scientific Library.)

The Wood Chipper, Paper Industry and Paper World for September 1948. (Copy in Div. 30.) Pages 883–888.

WILLIAM W. DYER, JR., *Primary Examiner.*

W. D. BRAY, *Assistant Examiner.*